(12) United States Patent (10) Patent No.: US 7,983,249 B2
Galluzzo et al. (45) Date of Patent: Jul. 19, 2011

(54) ENTERPRISE WEB SERVICE DATA TO MOBILE DEVICE SYNCHRONIZATION

(75) Inventors: John Galluzzo, Londonderry, NH (US); George Nemitz, Pennington, NJ (US)

(73) Assignee: Oracle America, Inc., Redwood Ctiy, CA (US)

( * ) Notice: Subject to any disclaimer, the term of this patent is extended or adjusted under 35 U.S.C. 154(b) by 741 days.

(21) Appl. No.: 11/626,238

(22) Filed: Jan. 23, 2007

(65) Prior Publication Data

US 2008/0176536 A1 Jul. 24, 2008

(51) Int. Cl.
*H04L 12/50* (2006.01)
*G06F 15/16* (2006.01)
(52) U.S. Cl. ......... 370/359; 709/248; 709/249; 370/503
(58) Field of Classification Search ........................ None
See application file for complete search history.

(56) References Cited

U.S. PATENT DOCUMENTS

| 7,155,521 | B2* | 12/2006 | Lahti et al. | 709/227 |
| 7,222,139 | B2* | 5/2007 | Mau | 707/204 |
| 7,289,788 | B2* | 10/2007 | Shan | 455/410 |
| 7,404,011 | B2* | 7/2008 | Hansmann et al. | 709/248 |
| 7,437,484 | B2* | 10/2008 | Auriemma et al. | 709/248 |
| 2003/0220966 | A1* | 11/2003 | Hepper et al. | 709/203 |
| 2005/0228812 | A1* | 10/2005 | Hansmann et al. | 707/102 |
| 2006/0031264 | A1* | 2/2006 | Bosworth et al. | 707/200 |
| 2006/0117073 | A1* | 6/2006 | Bosworth et al. | 707/201 |
| 2007/0112880 | A1* | 5/2007 | Yang et al. | 707/201 |
| 2008/0168292 | A1* | 7/2008 | Freedman | 713/375 |
| 2008/0270490 | A1* | 10/2008 | Watterott et al. | 707/204 |
| 2008/0270629 | A1* | 10/2008 | Yang et al. | 709/248 |

OTHER PUBLICATIONS

Getting Started with Data Synchronization Using SyncML; Q. H. Mahmoud; Sep. 2004.*

* cited by examiner

*Primary Examiner* — Jinsong Hu
*Assistant Examiner* — William Nealon
(74) *Attorney, Agent, or Firm* — Marsh Fischmann & Breyfogle LLP; Jonathon A. Szumny; Kent A. Lembke

(57) ABSTRACT

A Mobile Enterprise Platform utilizes a web based service that synchronizes enterprise data between a plurality of disparate mobile devices and a plurality of backend enterprise resources. The Mobile Enterprise Platform creates a web service synchronization source instance using Hypertext Transfer Protocol ("HTTP") for each application or database present on a plurality of mobile devices. Corresponding to each of these web service synchronization source instances is a web based synchronization service associated with a specific backend enterprise resource. Each synchronization service is web based and can thus live anywhere on the network or on a dedicated services tie as they need only to supply a small set of operations to offer synchronization capability to a variety of mobile devices.

18 Claims, 7 Drawing Sheets

ENTERPRISE WEB SERVICE DATA TO MOBILE DEVICE SYNCHRONIZATION

BACKGROUND OF THE INVENTION

1. Field of the Invention

Embodiments of the present invention relate, in general, to enterprise architecture and particularly to enabling mobile wireless devices to interact and synchronize with backend enterprise servers.

2. Relevant Background

Increasingly, business data processing systems, entertainment systems, and personal communications systems are implemented by computers across networks that are interconnected by the Internet. The Internet is a collection of heterogeneous computers and networks coupled together by a web of interconnections using standardized communications protocols. The Internet is characterized by its vast reach as a result of its wide and increasing availability and easy access protocols. As a result the Internet has rapidly emerged as the preferred system for distributing and exchanging data. Data exchanges support applications including electronic commerce (e-commerce), broadcast and multicast messaging, videoconferencing, gaming, e-mail and the like. Similarly, wireless devices have transformed the means by which individuals interact with the Internet. Cellular telephones and Personal Digital Assistants ("PDAs") that can both facilitate voice and data communication have become commonplace.

The intersection between wireless technology and the Internet is one of explosive growth. A user familiar and comfortable with the services and conveniences that the Internet can provide in a typically networked environment often demands the same features to be available on his or her PDA or cellular telephone. Just as with the infancy of the Internet, services provided on such wireless devices, such as personal information management, are generally proprietary. Recall that when the Internet made its debut providers such as CompuServe and Prodigy both offered rudimentary Internet-like services but only within their respective networks. The service was limited and proprietary to those within the networks. As a result an individual using CompuServe could not send any Internet content to an individual using Prodigy or vice-versa. It was the adoption of Hypertext Terminal Protocol ("HTTP") and Hypertext Markup Language ("HTML") that resolved this issue.

Currently wireless devices can access enterprise e-mail but do so in a proprietary nature. For example a Research In Motion ("RIM") Blackberry™ assesses a user's enterprise e-mail using their own, RIM's, proprietary technology. Similarly a device executing applications using the Palm Operating System may access a user's enterprise e-mail using Palm proprietary technology. For a company to provide to its users (employees) the ability to use multiple types of mobile devices and/or platforms (i.e. a Blackberry or Palm) the company must independently support each technology's enterprise interface. Thus for practical purposes most companies choose one type of device using one type of proprietary technology.

Recognizing the usefulness of mobile devices, enterprises increasingly desire their mobile devices to have the capability to access more than just e-mail. Enterprises wish to mobilize multiple applications on multiple devices without the expense of separate solutions for each type of device. Just as with the evolution of e-mail, enterprises are seeking an open, device agnostic synchronization platform.

SUMMARY OF THE INVENTION

Briefly stated, embodiments of the present invention involve a web services based Mobile Enterprise Platform utilizing a web services based service that synchronizes enterprise data between a plurality of disparate mobile devices and a plurality of backend enterprise resources. The Mobile Enterprise Platform creates a web service synchronization source instance for each application or database present on a plurality of mobile devices. Corresponding to each of these web service synchronization source instances is a web based synchronization service. Each synchronization service is associated with a specific backend enterprise resource. Synchronization services are web based and thus can live anywhere on a network or on a dedicated services tier as they need only to supply a small set of operations to offer synchronization capability to a variety of mobile devices.

The Mobile Enterprise Platform is an open source based platform constructed using standard communication protocols. SyncML is used as a common language across all mobile devices. Other industry standard communication protocols are used to communicate between the synchronization engine, housed within the Mobile Enterprise Platform and the plurality of synchronization services that access the actual enterprise resource data. Beyond data synchronization, the Mobile Enterprise Platform provides the capability to deliver applications and data content over-the-air. The Mobile Enterprise Platform also acts to manage the interactions between the plurality of mobile devices and the plurality of backend enterprise resources including matching users and mobile devices to particular backend enterprise resources.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
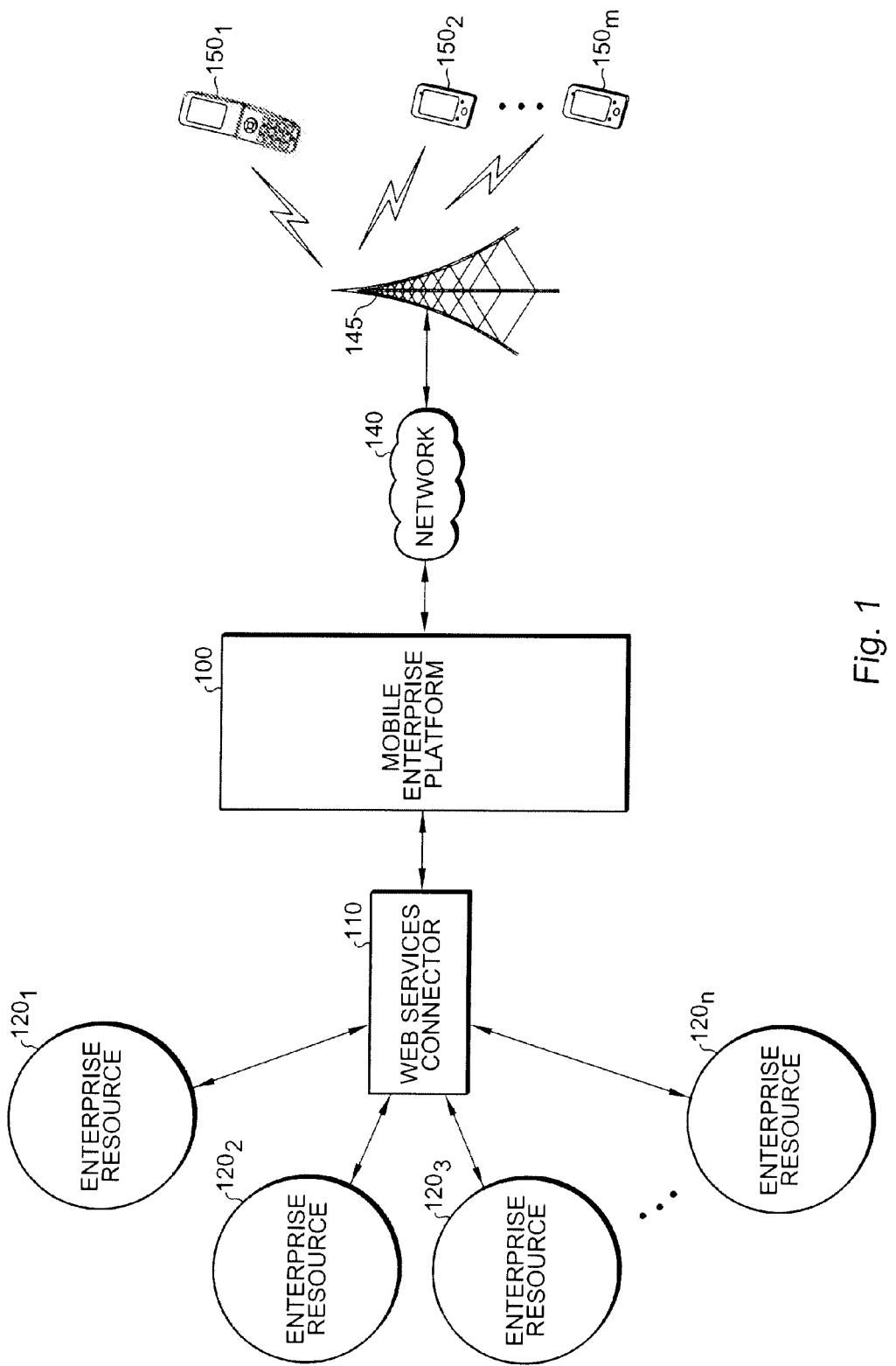
FIG. 1 shows an networked rendition of a Mobile Enterprise Platform interfacing a plurality of backend enterprise resources to a plurality of wireless mobile devices according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

A Mobile Enterprise Platform ("MEP") is described enabling investments in backend enterprise resources to be carried beyond typical uses. The majority of use of mobile devices revolves around PIM functionality such as e-mail, calendaring, and contact information. The MEP enables a user to conduct mobile device applications using backend enterprise resources or data. MEP is device agnostic meaning that any device operating any mobile operating system can equally access any backend enterprise resource. Furthermore, the MEP provides identity management, system management, over-the-air application and content delivery and device management that brings a diverse collection of functionality to a single coherent platform. As opposed to a solution based on a particular device, the MEP approach is a solution designed around standard technologies wherein its messages and communications are based on common protocols of Extensible Markup Language ("XML") and Hypertext Transfer Protocol ("HTTP").

The MEP is a central system/platform that combines the functionality found on various mobile enterprise devices available via disparate technology to a single common interface. The MEP architecture centers on the use of a web services connector, or web services connector module as it is sometimes called, to act as a single server-side module capable of interfacing with multiple backend enterprise resources through a web service and communicatively coupling them with a plurality of dissimilar mobile devices. Accordingly a plurality of disparate mobile devices such as a Blackberry™ or Palm™ can equally access a variety of backend enterprise resources such as MySQL, Oracle, Siebel, SAP, People Soft, etc.

FIG. 1 shows a networked rendition of a MEP interfacing a plurality of backend enterprise resources to a plurality of wireless mobile devices according to one embodiment of the present invention. A plurality of mobile devices $150_1$, $150_2$, ... $150_m$, are in communication with a plurality of backend enterprise resources $120_1$, $120_2$, $120_3$, ... $120_n$, via wireless link 145, the Internet 140, a web services connector 110 and the MEP 100. In one embodiment of the present invention the MEP uses Open Mobile Alliance ("OMA") SyncML to connect mobile devices 150 to the backend enterprise resources 120 via web services. OMA SyncML is an XML based representation protocol that uses document type definition to define the XML document and thereafter provides commands and data representations.

Generally a web service is a collection of protocols and standards used for exchanging data between applications and/or systems. According to one embodiment of the present invention the MEP uses a web service that is an XML object that comprises content, application code, application logic, etc. that can be accessed over any TCP/IP network using Simple Object Access Protocol ("SOAP") standard for integration, Web Service Description Language ("WSDL") (also sometimes referred to as Web Service Definition Language) for self description and Universal Description, Discovery and Integration ("UDDI") standard for registry and discovery within private and/or public directories. SyncML is an industry-wide common data synchronization protocol created in response to the proliferation of different, proprietary data synchronization protocols for mobile devices.

The present invention, according to one embodiment, allows synchronization data provided in SyncML by the MEP 100 and as initiated by a mobile device 150, to synchronize against externally running web services connectors 110, referred to as synchronization services. These synchronization services, which support standard web protocols such as HTTP, SOAP, and WSDL, implement operations necessary to allow mobile devices 150 to synchronize their data to backend enterprise resources 120.

Although not required, the invention may be described in the general context of computer-executable instructions, such as program modules or software, being executed by a personal computer. Generally, program modules include routines, programs, objects, components, data structures and the like that perform particular tasks or implement particular abstract data types. Moreover, those skilled in the art will appreciate that the portion of the invention embodied as code may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device in the form of a conventional personal computer, server, or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read-only memory ("ROM") and random access memory ("RAM"). A basic input/output system ("BIOS"), containing the basic routines that help to transfer information between elements within the personal computer, such as during start-up, is stored in ROM. The computer may further include a hard disk drive for reading from and writing to a hard disk, a magnetic disk drive for reading from or writing to a removable magnetic disk, and an optical disk drive for reading from or writing to a removable optical disk such as a CD-ROM or other optical media. The hard disk drive, magnetic disk drive, and optical disk drive are connected to the system bus by a hard disk drive interface, a magnetic disk drive interface, and an optical drive interface, respectively. The drives and their associated computer-readable media provide non-volatile storage of computer readable instructions, data structures, program modules and other data for the personal computer. Although the exemplary environment described herein employs a hard disk, a removable magnetic disk and a removable optical disk, it should be appreciated by those skilled in the art that other types of computer readable media which can store data that is accessible by a computer, such as magnetic cassettes, flash memory cards, digital video disks, random access memories ("RAM"s), read-only memories ("ROM"s) and the like may also be used in the exemplary operating environment.

The computer may operate in a networked environment using logical connections to one or more other computers, acting as a remote computer. The logical connections include a local area network ("LAN") and a wide area network ("WAN"). Such networking environments are commonplace in offices, enterprise-wide computer networks, Intranets and the Internet.

When used in a LAN networking environment, the computer is connected to the local network through a network interface or adapter. When used in a WAN networking environment, the personal computer typically includes a modem or other means for establishing communications over the wide area network, such as the Internet. The modem, which may be internal or external, is connected to the system bus via the serial port interface. In a networked environment, program modules depicted relative to the personal computer, or portions thereof, may be stored in the remote memory storage device. It will be appreciated that other means of establishing a communications link between the computers may be used.

Figure 2:
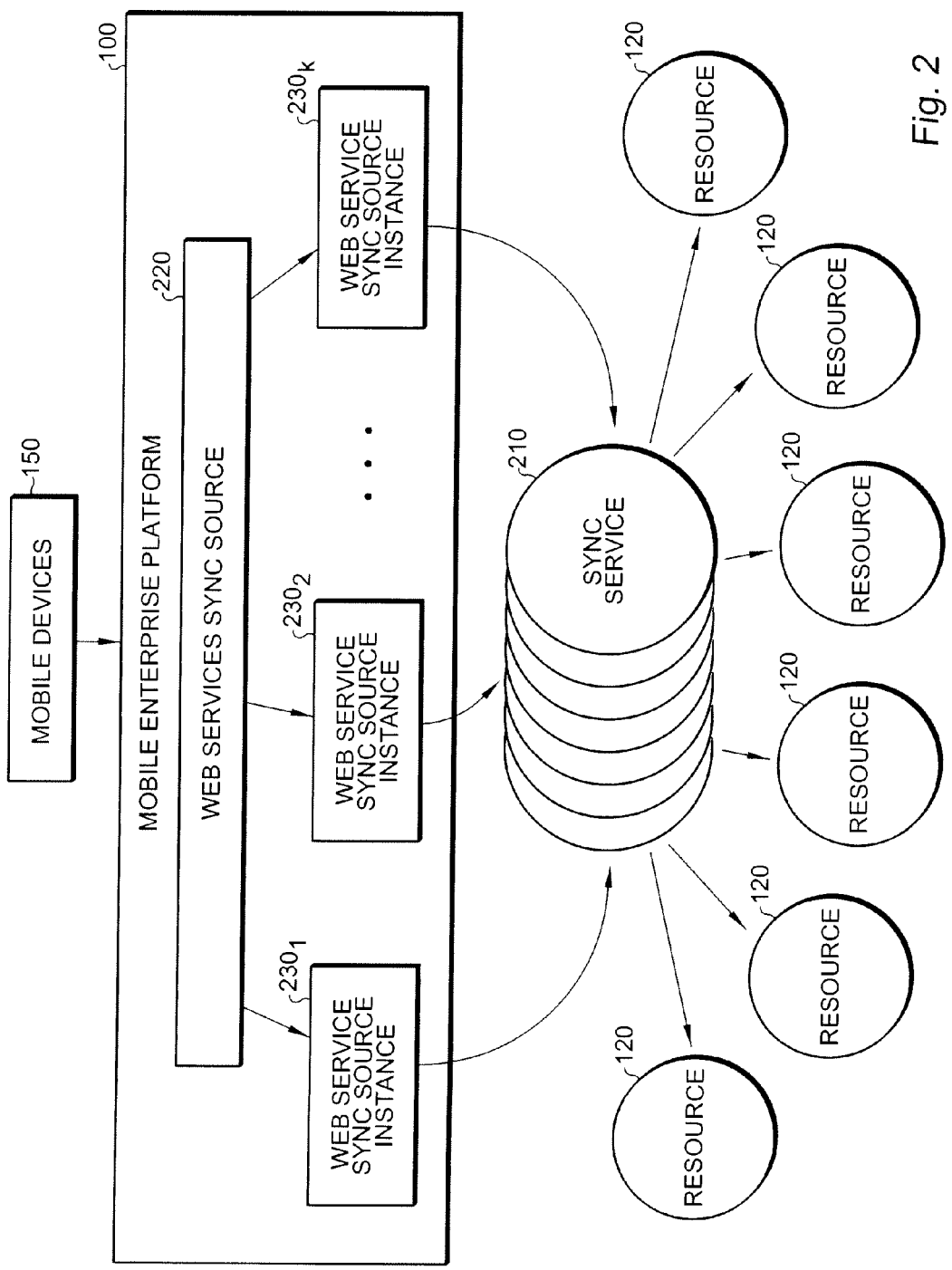
FIG. 2 shows a high level block diagram of a Mobile Enterprise Platform and its components as well as its relationship to a plurality of mobile devices and a plurality of backend enterprise resources, according to one embodiment of the present invention.

FIG. 2 shows a high level block diagram of a MEP and its components as well as MEP's relationship to a plurality of mobile devices and a plurality of backend enterprise resources, according to one embodiment of the present invention. The MEP 100 comprises, according to one embodiment, a web services synchronization source 220 and a plurality of web service synchronization source instances $230_1$, $230_2$, ... $230_k$. The MEP 100 is responsible for instantiating each synchronization source instance 230 for each synchronization session. According to one embodiment of the present invention, when a mobile device 150 initiates a synchronization session, a unique synchronization source instance 230 occurs. The web services synchronization source 220 instantiates a unique web service synchronization source instance 230 for each synchronization request.

The web service synchronization source instances 230 are worker threads within the MEP 100 and are each configured to communicate with specific synchronization services 210. Each synchronization service 210 is linked to a specific backend enterprise resource 120 thus enabling data from the mobile device 150 to be synchronized with that of a particular backend enterprise resource 120. Each synchronization service 210 implements an interface with a particular backend enterprise resource 120. The MEP 100 removes the addition/integration of backend data for synchronization out of the realm of the synchronization server (MEP). Thus, the synchronization service 210 can live anywhere on the network or on a dedicated services tier as long as the MEP 100 and web service synchronization source instance 230 can access them via HTTP(S). Furthermore, the synchronization service 210 only needs to supply implementation for a small set of operations in order to enable synchronization capability to a plurality of dissimilar mobile devices 150 thus adding to the invention's versatility.

Figure 3:
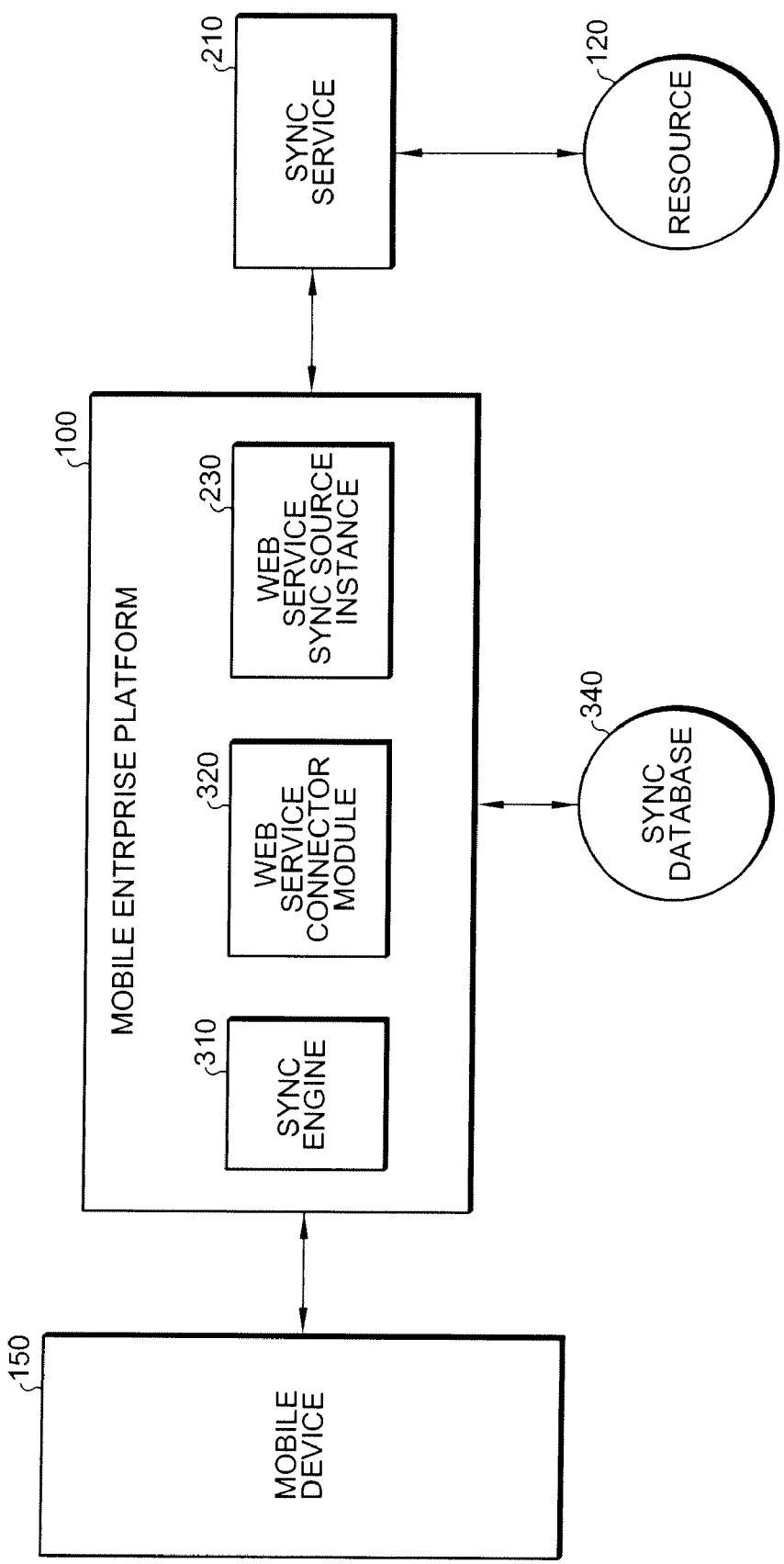
FIG. 3 shows a simplified block diagram of functional components of one embodiment of a Mobile Enterprise Platform and its interface between a mobile device and a backend enterprise resource.

FIG. 3 shows a simplified block diagram of functional components of one embodiment of a Mobile Enterprise Platform and its interface between a mobile device and a backend enterprise resource. As shown a device 150, MEP 100, synchronization service 210, and backend enterprise resource 120 are communicatively linked. In one embodiment of the present invention the communication link is via the Internet while in other embodiments other networks, as are known to one skilled in the art, may be used to convey communications between the various components. The MEP 100 is shown in FIG. 3 to comprise a synchronization engine 3 1 0, a web service connector module 320 and a web service synchronization source instance 230. In communication with the synchronization engine 3 1 0 is a synchronization database 340.

According to one embodiment of the present invention, a request to synchronize data is initiated by the mobile device 150 and conveyed to the MEP 100. The request is received by a synchronization servlet (not shown) and recognized by the synchronization engine 310. The synchronization engine 310 parses the request and identifies the backend enterprise resource 120 that is being targeted by accessing the synchronization database 340. Thereafter the web services connect module 320 configures a web service synchronization source instance 230. The synchronization source instance 230 is designed, based on the data obtained from the synchronization database 340 to delegate portions of the synchronization process to a web service 210 external to the MEP 100. This synchronization service 210 can be distributed anywhere within the network and communicated to using standard HTTP. It should be noted that each web service synchronization source instance 230 is a particular instance of the web service connector module 320 based on the synchronization request from the mobile device 150. Multiple instances can and will occur in the MEP 100, each one configured against a particular synchronization service 210 and backend enterprise resource 120.

Figure 4:
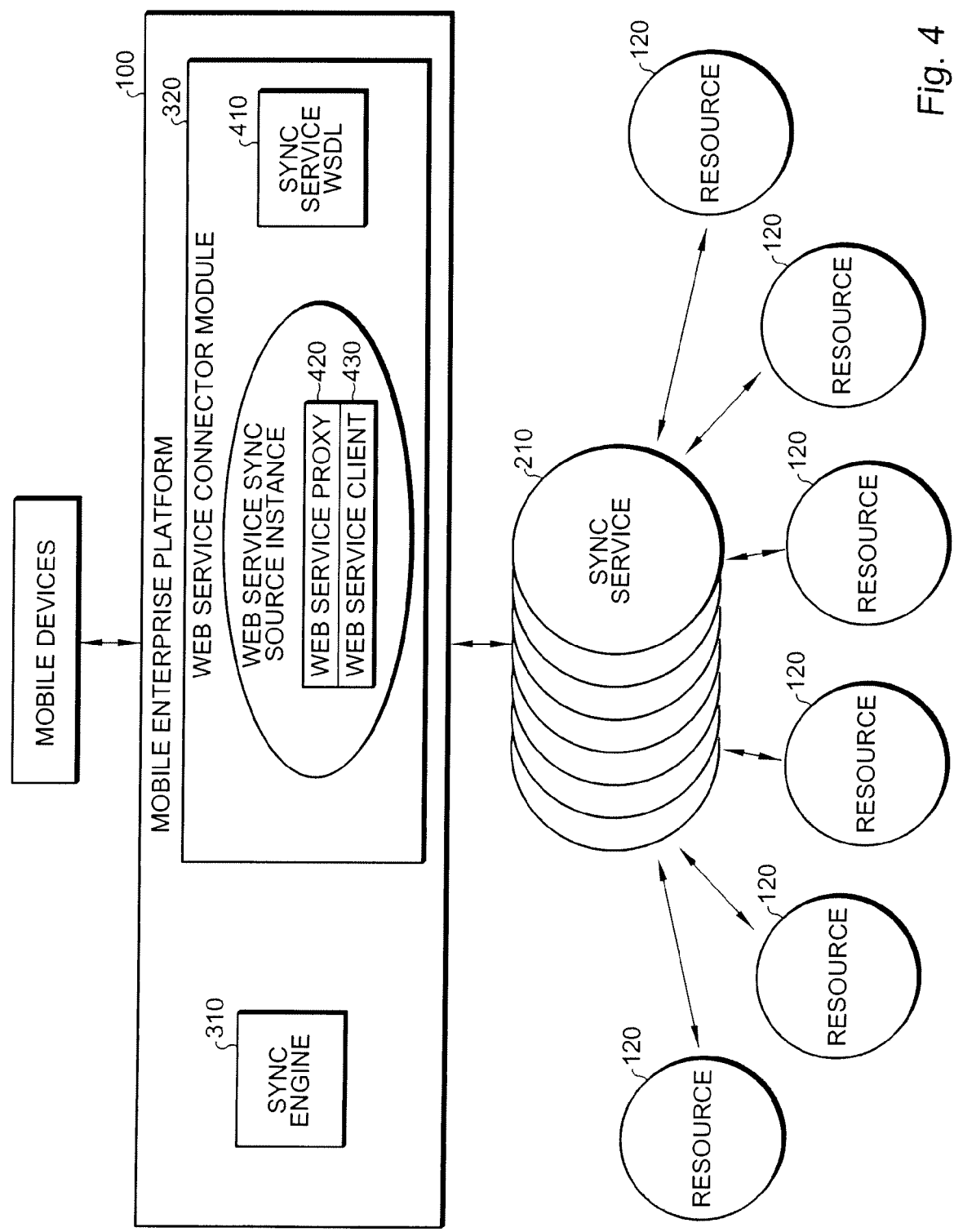
FIG. 4 is a high level block diagram of the Mobile Enterprise Platform according to one embodiment of the present invention, wherein the synchronization server and the web services connector module are distinct components.
Figure 5:
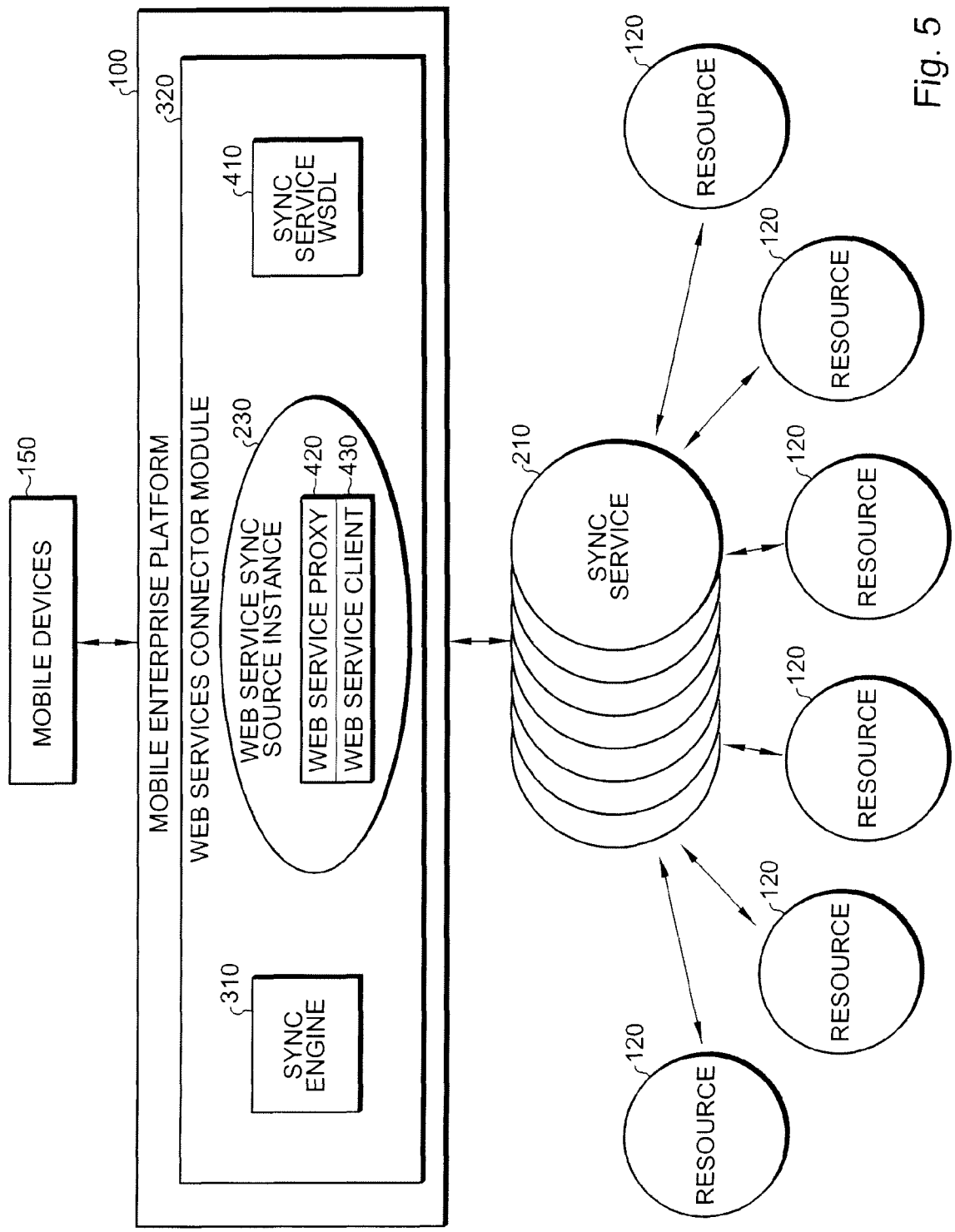
FIG. 5 is a high level block diagram of the Mobile Enterprise Platform according to one embodiment of the present invention, wherein the synchronization engine and the web services connector module are housed within the synchronization server.

FIGS. 4 and 5 are high level block diagrams of the Mobile Enterprise Platform according to two embodiments of the present invention, wherein in one embodiment (FIG. 4) the synchronization server (engine) and the web services connector module are distinct components and wherein in another embodiment (FIG. 5) the synchronization engine and web services connector module are housed within a common synchronization server. The synchronization engine 310 utilizes an internal database possessing data comprising users, device types and principals (wherein the principal is in the context of a combination of a user and a device), user roles, registration of server modules (a.k.a. plugins) information on the last synchronization of principals and synchronization sources, and identification mapping between mobile devices and backend enterprise resources. One skilled in the relevant art will appreciate that the various components of the MEP 100 maybe be distributed throughout the network without impairing on this functionality or its efficiency as long as communication flow is established from the mobile device 150 to the web service synchronization source instance 230 to the synchronization service 210.

Significantly, each rendition of the web services synchronization source instance 230 is comprised of a web service proxy 420 and a web service client 430. In addition a synchronization service WSDL 410 is coupled to the web service connector module 320 to provide configuration files for each instance. In the configurations shown in FIG. 4 and FIG. 5 the web services connector module 320 establishes a synchronization source interface (instance) that enables a particular resource to participate in a synchronization operation. To promote flexibility and decoupling FIG. 4 shows an architecture having a web services connector module 320 separate from the synchronization engine 310.

The web services connector module 320 can then develop a web service client 430/server relationship with multiple external web synchronization services 210. The web services connector module 320 comprises implementation logic for the web services synchronization source type and supporting configuration files. In the configuration shown in FIG. 5 the web services proxy 420 interfaces with the synchronization engine 310 as in the previous embodiment but delegates the execution of the interface to the web services client 430. The web services client 430 then makes calls to the external synchronization service 210 update, and gets updated data, from the backend enterprise resource 120. In both cases the WSDL prescribes the contract that synchronization services 210 must fulfill.

In yet another embodiment of the present invention the MEP is secured from both the backend enterprise resource environment and the mobile device environment by firewalls. The MEP and the functionality which it possesses serve as a barrier to intrusion both to the backend enterprise resources and each mobile device.

Figure 6:
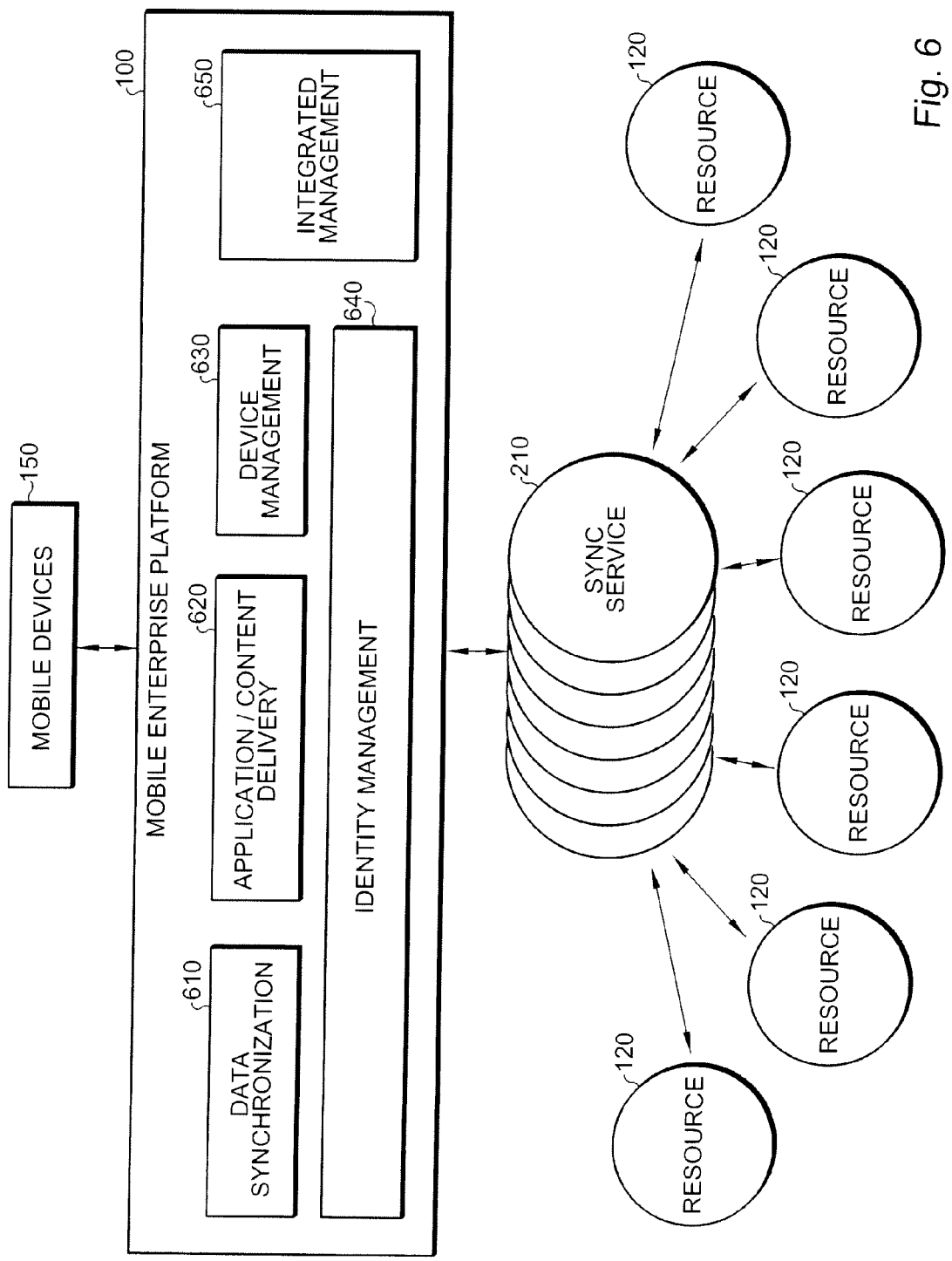
FIG. 6 is a high level block diagram showing some of the functional capabilities of the Mobile Enterprise Platform according to one embodiment of the present invention.

FIG. 6 is a high level block diagram showing some of the functional capabilities of the MEP according to one embodiment of the present invention. The MEP brings together functionality for mobile enterprise computing that is currently only available through disparate proprietary technology. The MEP is a single system that provides, among other things, synchronization of enterprise data sources, access to backend enterprise resources, management to provision mobile applications, and cross platform accessibility using various mobile devices (mobile device agnostic). These functionalities utilize existing standards to produce a decoupled architecture.

Other embodiments of the present invention provide the use with the ability to provision upgrades or new software to mobile devices via a wireless link. This over-the-air capability significantly enhances a user's edibility to manage access to backend enterprise resources. The MEP also enables users to remotely administer backend enterprise resources. For example, a mobile device communicating via a MEP to a variety of backend enterprise resources can, once the user is authenticated as possessing the correct credentials and privileges, modify, add, and/or delete user service settings for various backend enterprise resources. The MEP essentially enables the networked desktop computer to be truly mobile.

FIG. 6 depicts five significant functions of the MEP. As one of ordinary skill in the art will appreciate, the functionalities shown in FIG. 6 are not exclusive and represent only a few of the possibilities offered by such a versatile platform. The core of the MEP lies in its ability to synchronize data between disparate mobile devices 150 and a plurality of backend enterprise resources 120. To do so, the MEP possesses a data synchronization module 610 that is supported using SyncML and a synchronization server as has been previously described. An application and content delivery module 620 manages over-the-air provisioning of applications and content to mobile devices 150 while a device management module 630 enables the exchange of device characteristics and configuration management between the client and server. The device management module provides the user with the ability to remotely configure or reconfigure mobile devices, audit mobile devices, shut out certain mobile devices, and/or administer a poison pill to remotely destroy all data stored on a mobile device. These modules are interfaced and integrated with an identity management module 640 to manage various levels of access and privileges and integrate existing user stores to the MEP. A user may possess more than one mobile device. Thus the MEP must be able to handle a single user using the MEP to synchronize from multiple mobile devices or a single device that is jointly used by multiple users. The present invention accommodates these and other identity scenarios via the identity management module 640 by tracking synchronization state on the basis of the user/mobile device combination. The identify management module 640 also increases access based control to backend enterprise resources and can, if necessary, offer various security options.

An integrated management module 650 provides system wide management offering a single interface by which to manage all of the various subsystems that comprise the MEP. Furthermore developmental services that assist the user in preparing tools, method and application program interfaces that will assist in the speed and development of synchronization services 210 that interface with the backend enterprise resources 120 are also offered. With such a tool, the enablement of a new backend enterprise resources for synchronization to any mobile device is as simple as writing and testing a web service based synchronization service and creating on the MEP a new web service synchronization source instance in the server which is configured with the Uniform Resource Identifier ("URI") of the new service.

Figure 7:
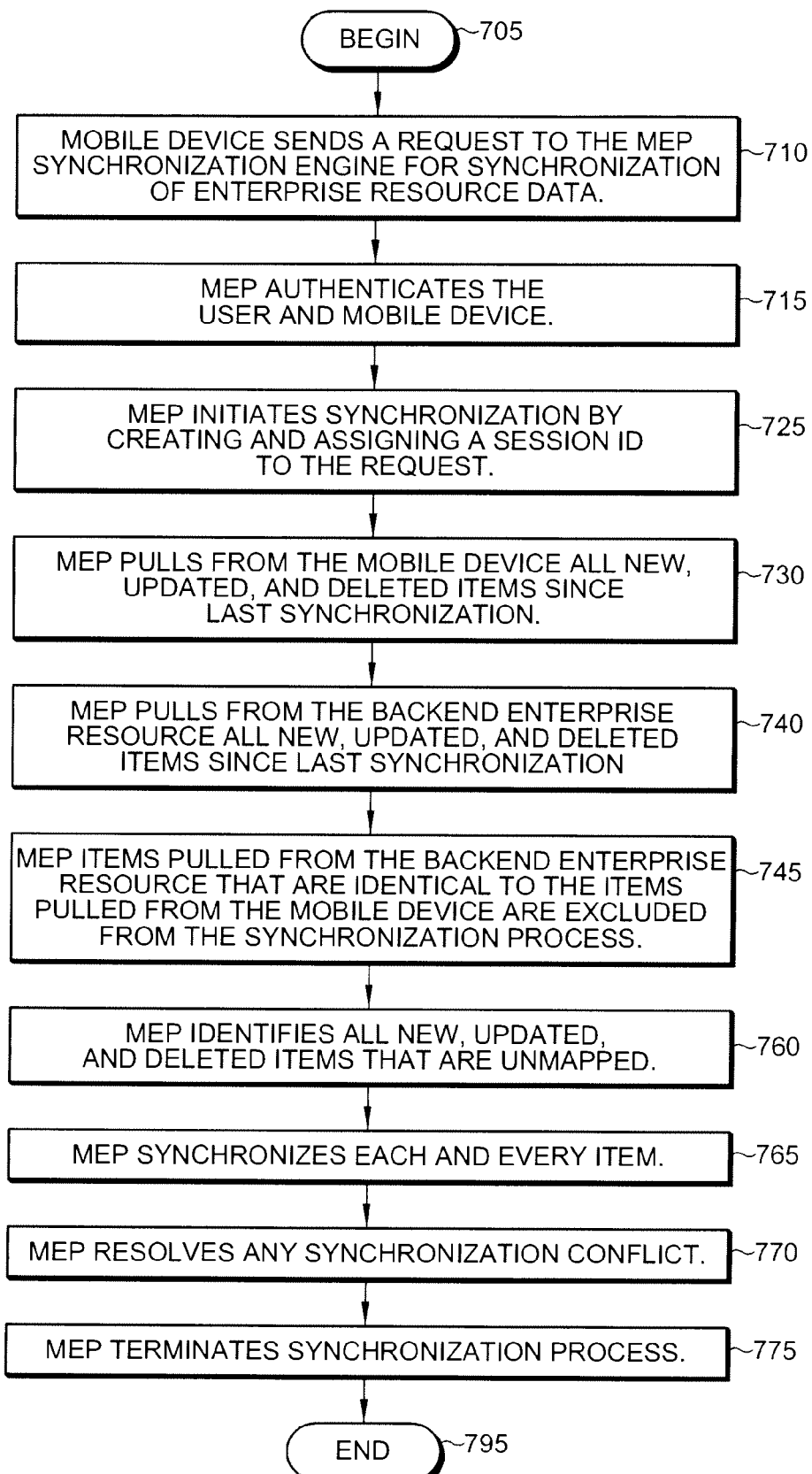
FIG. 7 is a flow chart for one embodiment of a method for synchronizing enterprise resource data between a mobile device and a backend enterprise resource, according to the present invention.

FIG. 7 is a flow chart illustrating methods of implementing an exemplary process for synchronizing enterprise resource data between a mobile device and a backend enterprise resource, according to one embodiment of the present invention. In the following description, it will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create a means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

The synchronization process depicted in FIG. 7 is a two-way exchange of information between a mobile device and a backend enterprise resource. In a typical scenario, a user possessing a mobile device will connect to the MEP and download data from a backend enterprise resource. Once downloaded the data is cached on the mobile device. The user can then disconnect the mobile device from the MEP and edit the data while offline. Periodically or when the user is once again within a region that permits wireless transmissions, the user reconnects to the MEP and uploads the updated data to the MEP. The MEP then synchronizes the data with that stored on the backend enterprise resource by comparing and unifying the data on the backend enterprise resource. Once the data on the backend enterprise resource is updated, the backend enterprise resource sends the modified data back to the mobile device via the MEP which then updates its local cache with the updated data. Data on the mobile device and the backend enterprise resource is now identical.

The two way synchronization is anticipated to be the most common operation performed by the MEP. Mobile device data records that were modified since the last synchronization operation are sent to the backend enterprise resource. Backend enterprise resource records that were modified since the last synchronization operation are sent to the mobile device. Data records are synchronized and unified data is sent to both the mobile device and the backend enterprise resource.

Referring to FIG. 7, the process begins 705 with a request 710, sent from a mobile device to the MEP, to synchronize data housed on the mobile device and that found at the backend enterprise resource. Upon receiving the request, the MEP authenticates 715 both the user and the device and then initiates the synchronization process by creating and assigning 725 a session identification (session ID) to the request. Thereafter the MEP pulls 730 from the mobile device all new, updated, and deleted items since the last synchronization. At the same time or shortly thereafter the MEP pulls 740 all new, updated and deleted items from the backend enterprise resource since the last synchronization.

The MEP then identifies and removes from the synchronization process 745 enterprise data pulled from both the mobile device and the backend enterprise resources that is identical. Despite the data being updated, new or deleted, it is apparently identical on both resources so by removing it from the process, valuable bandwidth and computing efficiencies can be gained. The MEP thereafter compares the data and identifies 760 all new, updated and deleted items that are unmapped. For example a new or modified data item present from the mobile device would be identified as would be a new or updated item from the backend enterprise resource. Similarly deleted items of the enterprise resource from the mobile device and the backend enterprise resource are compared. Those that are unmapped are identified for further operations.

The MEP then synchronizes 765 each and every remaining item. Occasionally a conflict may occur during the synchronization. For example after the data has been downloaded to the mobile device, another user may have changed a particular item in the data. Similarly the user who downloaded the data and is working offline also updates the same item of data. Upon synchronization the MEP identifies that the single piece of data has been modified at both the mobile device and the backend enterprise resource. To resolve this issue the MEP initiates a conflict matrix 770. Typically this matrix is governed by administrators of the backend enterprise resource however in other embodiments the resolution of the conflict may be based on user privilege level or the time of the modification. One skilled in the art will recognize that multiple outcomes of such a matrix are possible and each can be equally implemented by the MEP.

Once conflicts are resolved, should they exist, the synchronization of the data is accomplished and the process terminates 775. To do this the MEP sends a unified set of synchronized changes to the backend enterprise resource which is then updated with these changes. After the backend enterprise resource is updated with unified synchronization data, the MEP pulls the synchronized and now unified data from the backend enterprise resource and sends it to the mobile device ending the synchronization request 795. In other embodiments of the invention, the transmission of synchronized backend enterprise data is broadcast to all mobile devices holding such data so as to ensure all mobile devices possess the most current data.

As one skilled in the art will recognize, other synchronization scenarios are possible and are fully contemplated by the present invention. Scenarios such as unidirectional synchronization such as updates to the backend enterprise resource from the mobile device without the expectation of data in return or changes from the backend enterprise resource pushed to one or more mobile devices without the actual initiation of a mobile device centered synchronization request.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom. Accordingly, the disclosure of the present invention is intended to be illustrative, but not limiting, of the scope of the invention, which is set forth in the following claims.

We claim:

1. A method for synchronizing enterprise data between different backend enterprise resources and different network mobile devices, the method comprising:

accepting a request from a mobile device at a mobile enterprise platform to synchronize enterprise data present on the mobile device and on a backend enterprise resource, wherein the mobile enterprise platform is communicatively interposed between the backend enterprise resource and the mobile device;

parsing the synchronization request;

accessing a synchronization database to identify a backend enterprise resource being targeted by the mobile device;

configuring a synchronization source instance that is designed, based on data obtained from the synchronization database during the accessing step, to delegate portions of the synchronizing to a resource specific synchronization service independent of the mobile enterprise platform, wherein the resource specific synchronization service is configured to implement an interface with the backend enterprise resource;

receiving, via the resource specific synchronization service, enterprise data from the backend enterprise resource at the mobile enterprise platform; and sending, from the mobile enterprise platform, the received enterprise data to the mobile device so that the enterprise data on the mobile device is identical to the enterprise data sent from the backend enterprise resource.

2. The method of claim 1 wherein the resource specific synchronization service may reside anywhere on the network.

3. The method of claim 1 wherein resource specific synchronization service communications from the mobile enterprise platform to the backend enterprise resource use SOAP/HTTP protocols.

4. The method of claim 1 wherein the mobile enterprise platform interfaces with the resource specific synchronization service so that only required information is accessed from the backend enterprise resource.

5. The method of claim 1 wherein the mobile enterprise platform comprises a server isolated from both the mobile device and the backend enterprise resource by a firewall.

6. The method of claim 1 wherein the mobile enterprise platform comprises at least one resource proxy server and wherein the resource proxy server creates synchronization source instances.

7. The method of claim 1 wherein the mobile enterprise platform is XML based representation protocol wherein XML defined document type and is used for SyncML commands and data representation.

8. The method of claim 1 wherein SyncML is represented in XML and transported using HTTP.

9. A method for synchronizing enterprise data between a backend enterprise resource and a mobile device, the method comprising:

receiving a request from the mobile device at a synchronization server to synchronize enterprise data present on the mobile device and on the backend enterprise resource, wherein the synchronization server is communicatively interposed between the backend enterprise resource and the mobile device, and wherein the synchronization server is in communication with a synchronization database;

parsing the request and identifying the backend enterprise resource by accessing data associated with the synchronization database;

configuring a synchronization source instance that is designed, based on the data obtained from the synchronization database, to delegate portions of the synchronizing to a synchronization service independent of the synchronization server;

identifying enterprise data present on the mobile device that has been modified;

detecting by the synchronization service enterprise data present on the backend enterprise resource that has been modified;

gathering all modified enterprise data at the synchronization server;

synchronizing the modified enterprise data at the synchronization server; and updating enterprise data present on the backend enterprise resource via the synchronization service and enterprise data present on the mobile device with unified synchronized enterprise data independent of the type of mobile device and operating system associated with the mobile device.

10. The method of claim 9 wherein communications among the synchronization server, the backend enterprise resource and the mobile device is represented in XML and transported using HTTP.

11. The method of claim 9 wherein the synchronization server authenticates the mobile device.

12. The method of claim 9 wherein identifying and detecting are accomplished by the synchronization server.

13. The method of claim 9 wherein enterprise data that has been modified comprises new, updated and deleted enterprise data.

14. The method of claim 9, further comprising communicating among the synchronization server, the backend enterprise resource and the mobile device via a synchronization web service.

15. The method of claim 9, wherein the synchronizing comprises comparing modified enterprise data from the mobile device to modified data from the backend enterprise resource.

16. A mobile enterprise platform for enabling a plurality of different mobile devices to synchronize with a plurality of different backend resources, the mobile enterprise platform comprising:

a synchronization engine configured to accept a data synchronization request from a mobile device, parse the data synchronization request, and access a synchronization database to identify a backend resource being targeted by the mobile device; and a connector module operable to configure a unique synchronization source instance for each data synchronization request from the mobile device that is designed, based on data obtained from the synchronization database by the synchronization engine, to delegate portions of the synchronizing to a synchronization service independent of the mobile enterprise platform, wherein the unique synchronization source instance comprises:

a web service proxy for interfacing with the synchronization engine; and a web service client that executes an interface between the connector module and the synchronization engine; wherein the web service client is operable to connect with a synchronization service that is linked to one of the plurality of different backend resources; wherein the synchronization engine and the connector module are housed within a common synchronization server.

17. The mobile enterprise platform of claim 16, wherein the web services client is operable to call the synchronization service and obtain updated data from the one of the plurality of different backend resources.

18. The mobile enterprise platform of claim 16, further comprising a synchronization server web service description language ("WSDL") coupled to the connector module that is operable to provide configuration files for the unique synchronization source instance.

* * * * *

UNITED STATES PATENT AND TRADEMARK OFFICE
CERTIFICATE OF CORRECTION

| | | |
|---|---|---|
| PATENT NO. | : 7,983,249 B2 | Page 1 of 1 |
| APPLICATION NO. | : 11/626238 | |
| DATED | : July 19, 2011 | |
| INVENTOR(S) | : John Galluzzo et al. | |

It is certified that error appears in the above-identified patent and that said Letters Patent is hereby corrected as shown below:

Title page, item (73) Assignee - please delete "Ctiy" and insert therefore --City--.

Signed and Sealed this
Thirtieth Day of August, 2011

David J. Kappos
*Director of the United States Patent and Trademark Office*